Feb. 11, 1936.     J. GANZ     2,030,441
STEERING DEVICE FOR VEHICLES
Filed Feb. 12, 1932     3 Sheets-Sheet 1
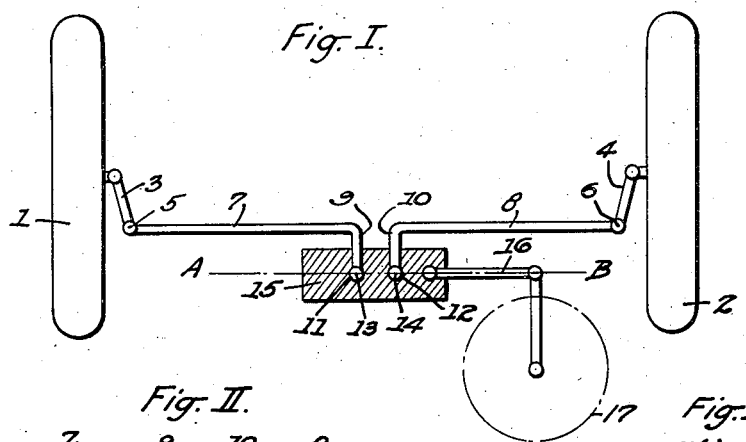
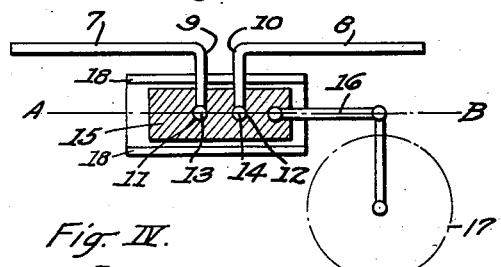
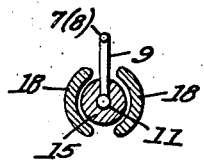
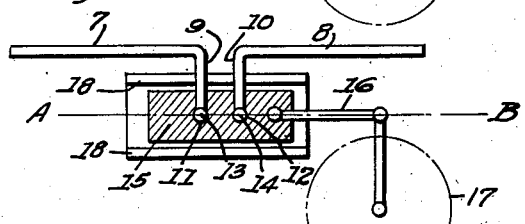
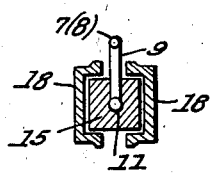
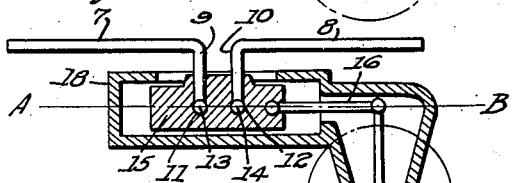
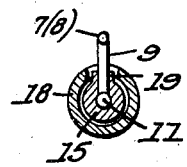
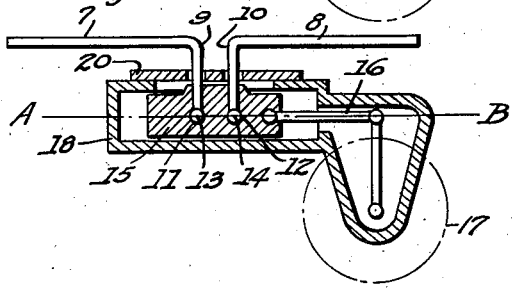
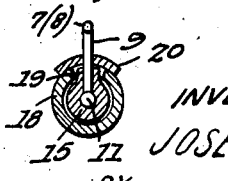
INVENTOR:
JOSEPH GANZ
BY
ATTORNEY Feb. 11, 1936.    J. GANZ    2,030,441
STEERING DEVICE FOR VEHICLES
Filed Feb. 12, 1932    3 Sheets-Sheet 2
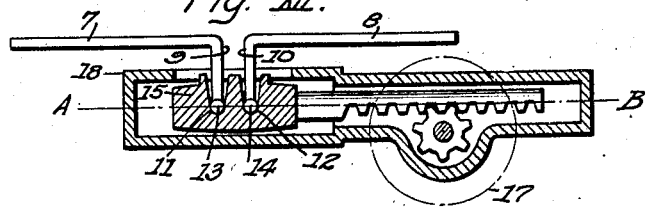
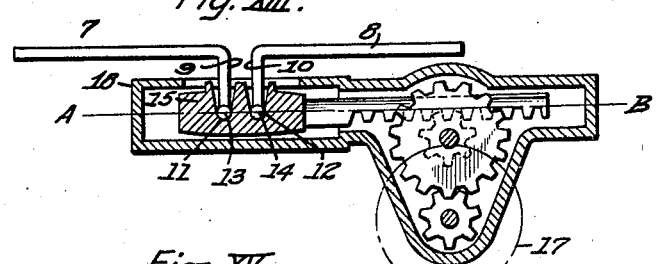
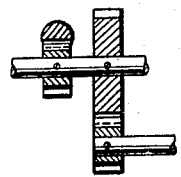
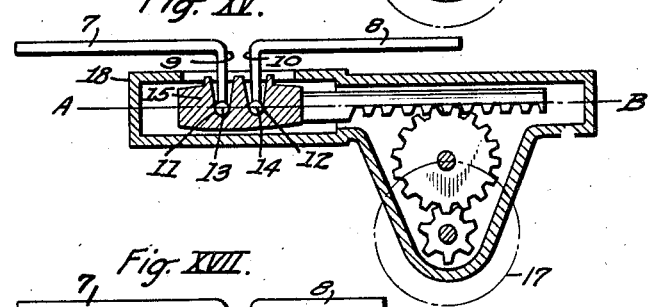
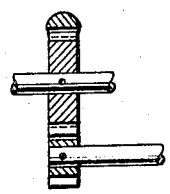
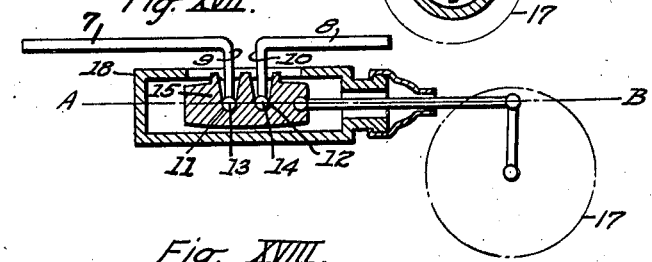
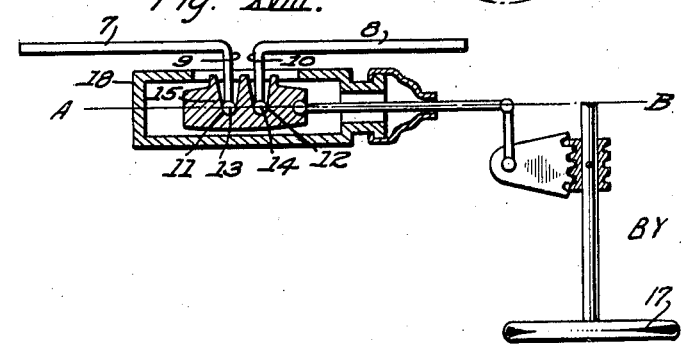
INVENTOR:
JOSEPH GANZ
BY
ATTORNEY Feb. 11, 1936.  J. GANZ  2,030,441
STEERING DEVICE FOR VEHICLES
Filed Feb. 12, 1932   3 Sheets-Sheet 3
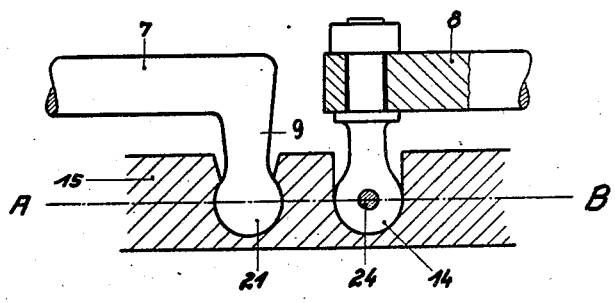 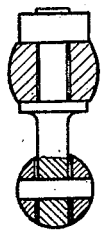
Fig. X.   Fig. XI.
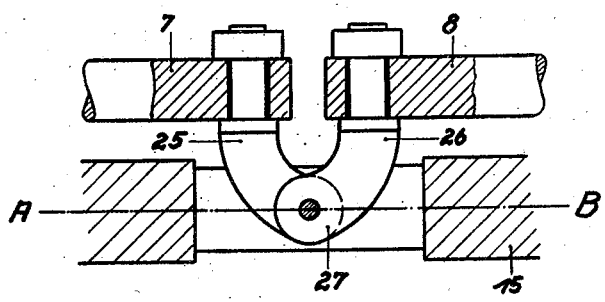 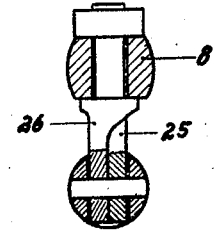
Fig. XIX.   Fig. XX.
INVENTOR
JOSEPH GANZ
BY
ATTORNEY Patented Feb. 11, 1936

2,030,441

UNITED STATES PATENT OFFICE 2,030,441

STEERING DEVICE FOR VEHICLES

Joseph Ganz, Frankfort-on-the-Main, Germany

Application February 12, 1932, Serial No. 592,516
In Germany February 16, 1931

10 Claims. (Cl. 280—95)

It is known that the guiding road wheels and more particularly independently suspended guiding wheels of vehicles, particularly motor vehicles may be steered individually. In this case, a steering gear coupling rod connecting the stub-axles of the wheels directly together is obviated. On the contrary, this coupling rod is connected by separate steering gear controlling rods, obliquity of both the right hand road wheel and the left hand road wheel being effected in the same way by a controlling rod for each wheel. The simplest and most preferable arrangements of this type employ for this purpose controlling rods extending transversely of the longitudinal axis of the vehicle.

Kinematically correct steering generally necessitates pivoting of the transverse controlling rods in the vicinity of the plane of symmetry of the vehicle. In practice, however, difficulties are experienced in doing this, due to the fact that the steering pillar is situated rather considerably to one side, the driver's seat being almost always situated outside the middle of the vehicle. If it was desired to prevent the controlling rods as they swung out from striking against the steering gear casing, it has been compulsory heretofore to abandon the pivoting of the controlling rods in the vicinity of the plane of symmetry of the vehicle, and hence to abandon kinematically correct steering. Or correct steering was secured at the price of moving the steering gear casing either to the front or to the rear, and it was necessary to be satisfied with indirect operation of the controlling rods by means of lever mechanism and the like or with the engagement of the controlling rods far outside the line of action of the transmission of the steering force which gives rise to tilting moments resulting in wear.

Fig. I illustrates diagrammatically a steering device for vehicles embodying the principles of the present invention.

Figs. II, IV, VI and VIII are diagrammatic views of modified embodiments of the present invention.

Figs. III, V, VII and IX are sectional views somewhat diagrammatic of Figs. II, IV, VI and VIII, respectively.

Fig. X is a fragmentary view, partly in section, showing the pivotal connection of the steering gear controlling rods in the transversely slidable member of the present steering device.

Fig. XI is a fragmentary view, partly in section, of the connection of the right-hand pivotal member and right-hand controlling rod shown in Fig. X.

Figs. XII, XIII and XV illustrate a variety of constructions utilizing gears for carrying the present invention into practice.

Fig. XIV is a fragmentary view, partly in section, of the gears employed in the driving mechanism of the embodiment illustrated in Fig. XIII.

Fig. XVI is a fragmentary view, partly in section, of the gears employed in the driving mechanism of the embodiment illustrated in Fig. XV.

Figs. XVII and XVIII illustrate further modifications of the present invention in which a link and crank are employed to actuate the transversely slidable member of the present steering device.

Fig. XIX is a fragmentary view, partly in section, showing a modified construction of the pivot connection of the transversely slidable member with the steering gear controlling rods; and Fig. XX is a sectional view of the pivotal connection shown in Fig. XIX with one of the controlling rods.

The present invention relates to a steering device for vehicles, more particularly motor vehicles, with individually-steered road wheels, the said steering device being constructed on the principle of the transverse coupling rod sub-divided in the vicinity of the plane of symmetry of the vehicle, in which steering device all the foregoing disadvantages of the known devices are completely avoided and which, in addition, is remarkable for its considerable simplicity and very great reliability. The essential feature of the steering device according to the invention consists in that the two controlling rods produced by the sub-division of the coupling rod correspond substantially in their total lengths to the steering axle trapeze, that is to say, a controlling rod measures about half the wheel gauge, and at the ends facing the middle of the vehicle is connected by angled extensions to joints having their centres situated within the narrow range of the line of action of the transmission of the steering force in a transversely slidable member which in turn is coupled to the steering wheel by a member extending in the line of action of the transmission of the steering force.

By means of such an arrangement, steering of exceptional reliability is secured with the use of a minimum of individual parts, since the points of engagement of the steering forces transferred to the controlling rods all lie within the narrow range of the line of action of the transmission of the steering force and hence tilting moments are practically entirely abolished. In addition the direction of throw agrees completely with the direction of the active and passive forces occurring in the steering mechanism, so that losses of power, avoidable wear and excessively stressed parts necessitating heavy and expensive construction are practically entirely avoided.

Figure I shows diagrammatically such a device according to the invention. 1 and 2 are the wheels to be steered, and 3 and 4 are their steering swivels, the pins 5 and 6 of which are engaged by the steering gear controlling rods 7 and 8. These controlling rods correspond in their total length substantially to that of the steering gear trapeze formed by the points of articulation of the steering swivels 3 and 4, and on their end parts facing the middle of the vehicle they are provided with the angled extensions 9 and 10, by which latter they are connected to joints 11 and 12 having their centres 13 and 15, situated, within the narrow range of the line of action A—B of the transmission of the steering force, in the transversely slidable member 15, for example, a plunger or the like. The latter in its turn is coupled to the steering wheel 17 by means of a member 16 extending in the direction of the line of action A—B of the transmission of the steering force.

As shown diagrammatically in Figures II and III, the transversely slidable member 15 may be conveniently guided for example in a slide 18. In doing this, it is preferable, as shown in Figures IV and V in a constructional example, to guide the member 15 in a rotationless manner, which may be effected, for example, by suitable profiling of the member 15 and of the slide 18.

A further preferred form of construction shown diagrammatically in Figures VI and VII is to carry the member 15 transversely slidable in a slide 18 which is closed except for a slit 19. As is likewise shown in Figure IV, the said slit may be utilized to advantage at the same time for the rotationless guiding of the suitably shaped member 15. Figures VIII and IX show the same construction with the additional advantage that the slit of the slide 18 is closed by a slider 20 which in its turn slides to-and-fro with the member 15 and prevents the penetration of dirt into the slit of the slide casing.

The coupling of the transversely slidable member 15 by means of a member extending in the line of action of the transmission of the steering force may be effected in a variety of suitable ways, for example by means of rack running in the suitable direction, if desired with pinion, and by means of intermediate gear wheels (Figures XII and XVI), or by means of a system of rods extending in the line of action A—B of the transmission of the steering force and if desired a transmission member (Figures XVII to XVIII). The most suitable choice of coupling as well as the decision regarding the arrangement of the controlling rods and of the transversely slidable member will be made in accordance with the character of the particular construction of the rest of the vehicle.

The articulated connection of the steering gear controlling rods or of their angled extensions, in the narrow range of the line of action of the transmission of the steering force, in the transversely slidable member may likewise be effected in a variety of suitable ways, for example, such that (see Figures X and XI) the controlling rods 7, on their end portions facing the middle of the vehicle, are articulated by means of bolts 9 shaped spherically, for instance in the form of a ball, at their end 21, to the transversely slidable member 15 provided with corresponding recesses 22, or for example, such that the controlling rods 8 carry hingedly or rotatably angularly connected extensions or bolts 23 connected to joints 24 whose centre 14 is likewise situated in the narrow range of the line of action A—B of the transmission of the steering force, in the suitably shaped member 15.

The articulated connection of steering gear controlling rods and transversely slidable member 15 in the meaning of the invention may also be effected for example such that (see Figures XIX to XX) the steering gear controlling rods 7 and 8 on their ends facing the middle of the vehicle are provided with hingedly or rotatably oblique extensions 25 and 26 which in their turn are angularly connected to the transversely slidable suitably shaped member 15 by joints 27 whose centre is likewise situated in the narrow range of the line of action A—B of the transmission of the steering force.

I claim:—

1. A steering device for a vehicle with individually steered road wheels and with a steering column arranged on one side of the plane of symmetry thereof which comprises a rotationless member mounted approximately in the vicinity of the plane of symmetry of the vehicle and being capable of only sliding transversely to said plane, a steering gear controlling rod having one end pivotally mounted in said rotationless member approximately at said plane of symmetry and having its other end operatively associated with one of said road wheels, said controlling rod being substantially parallel to said rotationless member and extending from said plane of symmetry to said wheel, a second steering gear controlling rod pivotally mounted in said rotationless member approximately at said plane of symmetry and extending to the other road wheel, and mechanical means connected to said rotationless member and extending to one side of the plane of symmetry of the vehicle for moving said slidable rotationless member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

2. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, a second steering gear controlling rod pivotally mounted in said slidable member approximately at said plane of symmetry and extending to the other road wheel, and mechanical means connected to said slidable member and extending to one side of the plane of symmetry of the vehicle for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

3. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, a second steering gear controlling rod pivotally mounted in said slidable member approximately at said plane of symmetry and extending to the other road wheel, an arm operatively connected to one end of said slidable member and extending in a direction substantially coincident with the line of action of the steering force, said arm terminating in a region intermediate between the plane of symmetry and a plane passing through one of said road wheels, and means associated with said arm to cause movement thereof in order to effect a movement of the slidable member and the controlling rods to individually steer each of said road wheels, and mechanical means for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

4. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, an angled joint connecting said controlling rod to said slidable member, a second steering gear controlling rod pivotally mounted in said slidable member approximately at said plane of symmetry and extending to the other road wheel, and mechanical means connected to said slidable member and extending to one side of the plane of symmetry of the vehicle for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

5. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, an angled joint connecting said controlling rod to said slidable member, said angled joint being ball shaped at the end thereof and fitting in a corresponding recess in said slidable member, a second steering gear controlling rod pivotally mounted in said slidable member approximately at said plane of symmetry and extending to the other road wheel, and mechanical means connected to said slidable member and extending to one side of the plane of symmetry of the vehicle for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

6. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a housing for said slidable member to guide the same and to prevent the rotation thereof, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, a second steering gear controlling rod pivotally mounted in said slidable member approximately at said plane of symmetry and extending to the other road wheel, and mechanical means connected to said slidable member and extending to one side of the plane of symmetry of the vehicle for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

7. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, a second steering gear controlling rod pivotally mounted in said slidable member approximately at said plane of symmetry and extending to the other road wheel, a steering wheel associated with said vehicle for steering the same, and means extending to one side of the plane of symmetry in line with the direction of force of the said slidable member including gear mechanism for transmitting force from said steering wheel to said slidable means, and mechanical means for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

8. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, a second steering gear controlling rod pivotally mounted in said slidable member approximately at said plane of symmetry and extending to the other road wheel, an arm operatively connected to one end of said slidable member and extending in a direction substantially coincident with the line of action of the steering force, said arm terminating in a region intermediate between the plane of symmetry and a plane passing through one of said road wheels, a rack mounted at the end of said arm, and means including gear mechanism associated with the rack on said arm to cause movement thereof in order to effect a movement of the slidable member and the controlling rods to individually steer each of said rod wheels, and mechanical means for moving said slidable member transversely to move the said controlling rods parallel thereto so as to individually steer each of the road wheels, said mechanical means having an effective line of force extending through said rotationless member and the pivotal mountings of the steering gear controlling rods at approximately the plane of symmetry of the vehicle.

9. A steering device for a vehicle with individually steered road wheels and with a steering column arranged on one side of the plane of symmetry thereof which comprises a slidable member mounted approximately in the vicinity of the plane of symmetry of the vehicle and being capable of only sliding transversely to said plane, a steering gear controlling rod having one end pivotally mounted in said slidable member approximately at said plane of symmetry and having its other end operatively associated with one of said road wheels, said controlling rod being substantially parallel to said slidable member and extending from said plane of symmetry to said wheel, a hingedly angled joint between said controlling rod and said slidable member, a second steering gear controlling rod pivotally mounted in said slidable member approximately at said plane of symmetry and extending to the other road wheel, and mechanical means connected to said slidable member and extending to one side of the plane of symmetry of the vehicle for moving said slidable member transversely to move the said controlling rods parallel thereto as to individually steer each of the road wheels, said mechanical means having an effective line of force extending through said rotationless member and the pivotal mountings of the steering gear controlling rods at approximately the plane of symmetry of the vehicle.

10. A steering device for a vehicle having individually steered road wheels and having a steering column at one side of the plane of symmetry of the vehicle, which comprises a guide mounted transversely at the plane of symmetry of the vehicle at a point substantially midway between said road wheels, a slidable member mounted therein capable of only sliding transversely to said plane, a steering swivel operatively associated with each wheel, a pair of steering gear controlling rods each having an end universally pivoted in said slidable member approximately at said plane of symmetry and each rod extending oppositely, one to each of said steering swivels to actuate the same, mechanical means directly connected to said slidable member and extending to one side of the plane of symmetry of the vehicle in line with the direction of force in the slidable member for moving said slidable member transversely.

JOSEPH GANZ.